Figure 1:
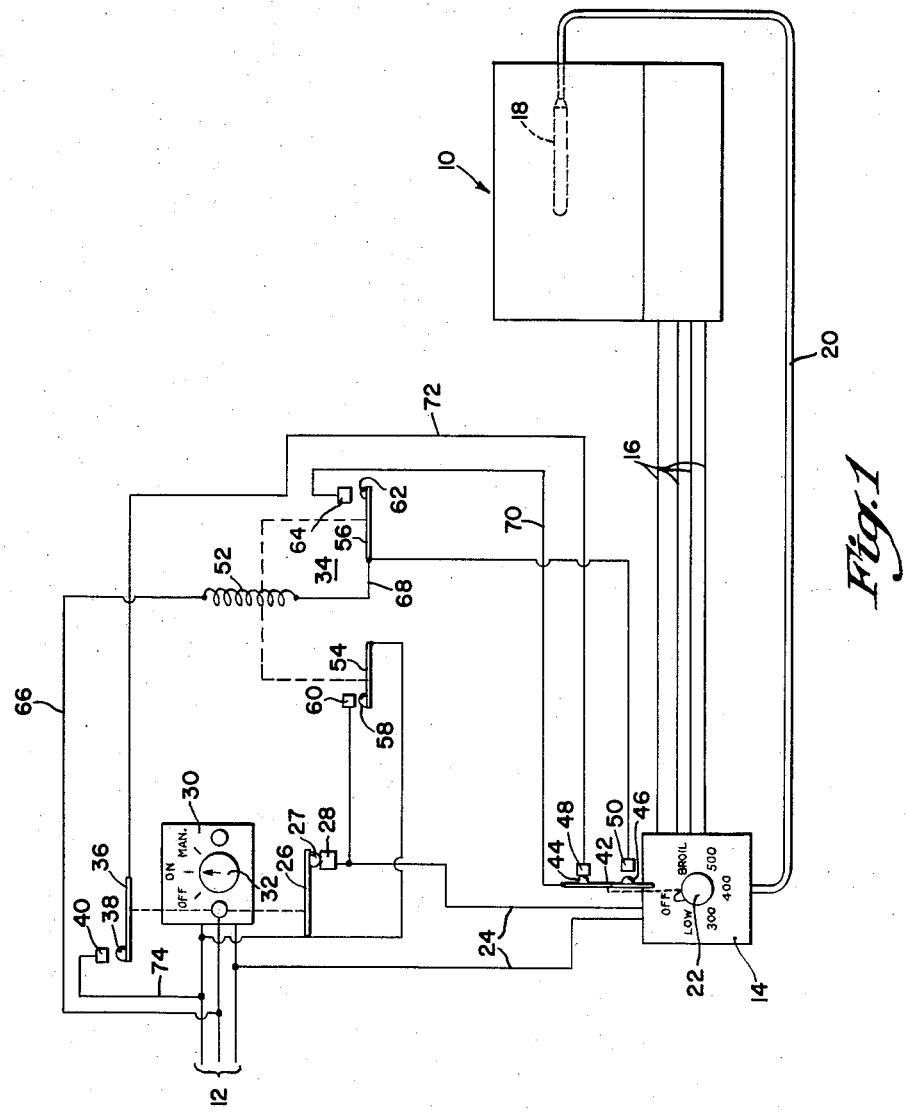

July 25, 1961

C. K. STROBEL 2,993,974

DOMESTIC APPLIANCE CONTROL

Filed July 30, 1958

2 Sheets-Sheet 1

July 25, 1961

C. K. STROBEL 2,993,974

DOMESTIC APPLIANCE CONTROL

Filed July 30, 1958

2 Sheets-Sheet 2

United States Patent Office 2,993,974
Patented July 25, 1961

2,993,974
DOMESTIC APPLIANCE CONTROL

Charles K. Strobel, Pittsburgh, Pa., assignor to Robertshaw-Fulton Controls Company, Richmond, Va., a corporation of Delaware
Filed July 30, 1958, Ser. No. 751,982
6 Claims. (Cl. 219—20)

This invention relates generally to a control for a domestic appliance and more particularly to an automatic timing device and thermostat control for the heating means of an electric range or the like.

Heretofore, electric ranges have been provided with a timer or clock control and a thermostatic control for enabling the operator to perform timed heating operations which could be commenced and terminated at some subsequent time. The usual type of timer or clock which has been utilized for this type of operation is one having at least a "manual" position in which the thermostat can be operated independently of the clock to control a heating operation, a timed "on" position wherein the thermostat is operative under the control of the clock and an "off" position to which the clock automatically moves at the completion of the timed "on" heating operation to terminate the timed heating operation.

The operation of these systems has generally been quite satisfactory but some dissatisfaction has been brought about by the inability to perform manual heating operation after the completion of a timed heating operation occasioned by the operator neglecting to manually return the clock from the "off" position to the "manual" position. Although this dissatisfaction has been brought about largely by inadvertence of the operator, it nevertheless exists and has occasioned many wholly unnecessary service calls by utility and appliance repair personnel.

Attempts at solving the problem have not been entirely satisfactory in that attempts have been made to automatically return the clock to the "manual" position from the "off" position by mechanical means which have the objectionable feature of overcoming large mechanical friction components which result in rather costly and elaborate controls. It is, accordingly, an object of this invention to prevent this unsatisfactory operation and needless repair calls by conditioning a heating system for manual operation of the thermostat in the "off" position of the clock.

It is another object of this invention to render a means operative in the "off" position of the clock for permitting a heating operation under the manual control of the thermostat.

In the preferred embodiment of the invention, a heating circuit is energized from a source of electric power and is controlled jointly by a thermostat operable between an "off" position and a plurality of heating positions, and a timing device operable between at least an "off" position and a timed "on" position for connecting the thermostat to the source of electric power. Means is provided and is rendered operative by movement of the thermostat to one of the plurality of heating positions when the timing device is in the "off" position for connecting the thermostat to the source of electric power independently of the timing device.

Figure 2:
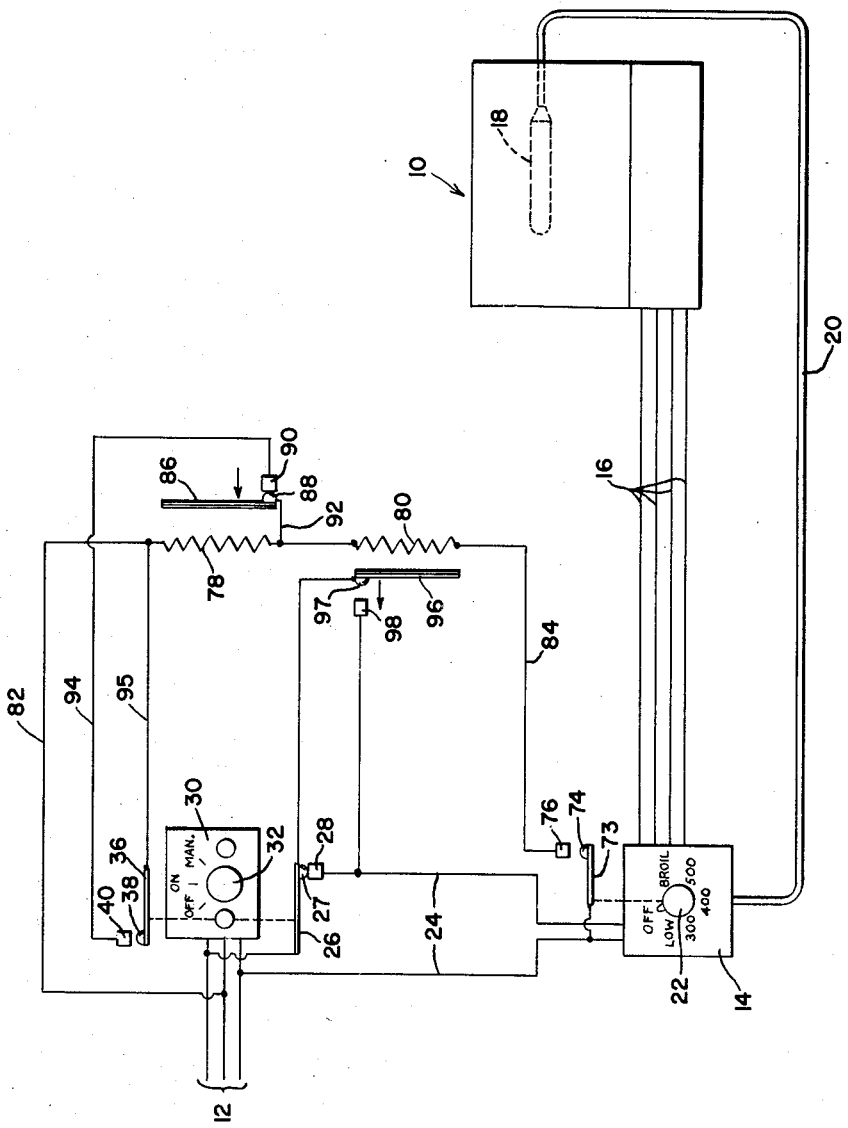

Other objects and advantages will become apparent from the following description taken in connection with the accompanying drawings wherein:

FIG. 1 is a schematic showing of the preferred embodiment of this invention; and FIG. 2 is a view similar to FIG. 1 showing a modification of this invention.

Referring to FIG. 1, the preferred embodiment, this invention is shown as being utilized in a system for controlling the energization of a plurality of heating elements (not shown) which may be energized from a suitable source of electric power such as a conventional three-wire 240/120 volt source found in the vast majority of homes. The heating elements can be considered to be disposed in an oven indicated generally at 10, the heat of which is to be controlled. A thermostatic switch 14 controls the energization of the heating elements disposed in oven 10 and is shown connected thereto by a plurality of wires 16. Thermostatic switch 14 may be of a conventional form actuated by a thermally responsive bulb 18 operatively connected thereto by a conduit 20 and disposed in oven 10. Thermostatic switch 14 may also include a manually operable control knob or dial 22 rotatable in a manner to move thermostatic switch 14 from an "off" position to any one of a plurality of controlling positions to which it will be responsive.

Thermostatic switch 14 is connected to the source of power 12 by a pair of wires 24 one of which has serially disposed therein a movable switch arm 26 carrying a contact 27 movable therewith and cooperable with a stationary contact 28. An electric timing device or clock 30, which may be of a conventional design, is shown connected to source 12 and is operable to move switch arm 26 and cause actuation of contact 27 between open and closed positions with contact 28. Clock 30 is shown as being operable between a plurality of controlling positions, which may include an "off" position, a "manual" position, and a timed "on" position, by manual rotation of a control knob or dial 32. When clock 30 is in an "off" position, contacts 27 and 28 are open.

In operation of the system thus far described, contact 27 will be in a closed position with contact 28 whenever the clock 30 is in the "manual" position thus completing an electric circuit from the source 12 through the wires 24 to thermostatic switch 14. Whenever a heating operation is to be thereafter controlled, the thermostatic switch 14 need only be moved by dial 22 to any one of the plurality of heating positions to complete the electrical circuit between wires 16 and 24 to energize the heating elements disposed in oven 10. The circuit, thus established, can be interrupted at any time by rotation of dial 22 to the "off" position.

When dial 32 of clock 30 is rotated to a timed "on" position, switch arm 26 is moved in a manner to close contact 27 on contact 28. Thereafter, subsequent movement of thermostatic switch 14 to one of the plurality of heating positions establishes the identical circuit described heretofore for the "manual" position of clock 30, to energize the heating elements disposed in oven 10. The clock 30 will thereafter time the heating operation and at the conclusion thereof, will automatically move to the "off" position and thereby move switch arm 26 in a manner to interrupt the circuit established between contacts 27 and 28. It will be readily apparent that a subsequent heating operation cannot be performed because of the open circuit condition between source 12 and thermostatic switch 14 unless the clock is either turned to the "manual" or to the timed "on" position to close contact 27 upon contact 28.

Circuitry is, however, provided to enable energization of the heating elements disposed in oven 10 whenever the clock is in the "off" position. This circuitry takes the form of a relay indicated generally at 34, a switch arm 36 carrying a contact 38 which is cooperable with a stationary contact 40, and a switch arm 42 carrying a pair of spaced contacts 44, 46 which are cooperable with a pair of stationary contacts 48, 50, respectively.

Switch arm 36 is operatively connected to clock 30 and is movable thereby to close contact 38 upon contact 40 when dial 32 is in the "off" position and to open the circuit established between contacts 38 and 40 in any other position of dial 32. Switch arm 42 is operatively connected to thermostatic switch 14 and is moved by rotation of dial 22 in a manner to cause movement of contacts 44, 48 and 46, 50 between open and closed positions. For purposes of this description, contacts 46, 50 are considered to be normally open contacts, movable momentarily to the closed position only upon movement of dial 22 from the "off" position to any one of the controlling positions. Contacts 44, 48 are considered to be normally closed contacts, movable momentarily to the open position only upon rotation of dial 22 from any one of the plurality of heating positions to the "off" position.

Relay 34, as indicated in FIG. 1, comprises a coil 52 which is energized from the source 12 for operating a pair of switch arms 54, 56. Switch arm 54 carries a contact 58 movable therewith and cooperable with a stationary contact 60 to provide a shunt connection across contacts 27, 28. Switch arm 56 carries contact 62 movable therewith and cooperable with a stationary contact 64. Contacts 46, 50, it will be noted, are connected in shunt with contacts 62, 64.

An energizing circuit for coil 52 is established by a wire 66 connecting one side of coil 52 to one side of the source of power 12, a wire 68 connecting the other side of coil 52 to switch arm 56, contacts 62, 64, a wire 70 connecting contact 64 to switch arm 42, contacts 44, 48, a wire 72 connecting contact 48 to switch arm 36, contacts 38, 40, and a wire 74 connecting contact 40 to the other side of the source of power 12.

The operation of this system when the clock 30 is in either the "manual" position or the timed "on" position will be exactly as described heretofore. However, when clock 30 is automatically moved to the "off" position moving contact 27 to an open position relative to contact 28 to terminate the timed heating operation, contact 38 will be moved into engagement with contact 40 to establish a circuit whereby a heating operation can be performed even though the clock remains in the "off" position. This circuit can be traced from one side of source 12 through wire 74, contacts 38, 40, switch arm 36, wire 72, contacts 44, 48, switch arm 42, wire 70 to contact 64 and from the other side of the source 12 through wire 66, coil 52, wire 68, switch arm 56 to contact 62. An alternate circuit from the other side of source 12 to contact 64 is provided through wire 66, coil 52, wire 68, contacts 50, 46 and switch arm 42. Since contacts 62, 64 and 46, 50 are maintained in their normal open position, a circuit for energizing relay coil 52 will not be established but the circuit is, however, placed into readiness for performing a heating operation independently of the clock 30 provided that the operator moves the thermostatic switch 14 from one of the plurality of heating positions to the "off" position.

With the circuit in readiness and with clock 30 in the "off" position, movement of thermostatic switch 14 by dial 22 from an "off" position to one of the plurality of heating positions causes movement of switch arm 42 and momentary engagement of contact 46 with contact 50 while contacts 44 and 48 remain closed to complete the alternate circuit for energizing coil 52. Energization of coil 52 causes actuation of switch arms 54, 56 and closure of contacts 62, 64 and contacts 58, 60. The closure of contacts 62, 64 provides the circuit to maintain coil 52 energized so long as thermostatic switch 14 remains in one of the plurality of heating positions and prevents de-energization of coil 52 upon the opening of contacts 46, 50. Closure of contacts 58, 60 establishes a circuit across contacts 27, 28 to connect thermostatic switch 14 to the source of power 12 and a heating operation can be thus performed even though contacts 27, 28 are maintained in the open position.

When the heating operation is to be terminated, the operator need only move dial 22 of thermostatic switch 14 to the "off" position and in so doing, will cause momentary movement of contacts 44, 48 to the open position thus interrupting the circuit between wires 70 and 72, the de-energization of coil 52, the opening of contacts 58, 60 to break the circuit between source 12 and thermostatic switch 14, and the opening of contacts 62, 64 to break the energizing circuit for coil 52.

In the following description of a modification of this invention, similar reference numerals will be used to designate identical parts of the different modifications. Thus, in FIG. 2, a switch arm 73 carries a contact 74 movable therewith and cooperable with a stationary contact 76. Switch arm 73 is connected to one side of the source 12 through the wire 24 uninterrupted by switch arm 26 and contacts 27, 28. Switch arm 73 is operative in a manner to maintain contacts 74, 76 in an open position when thermostatic switch 14 is in the "off" or open position and to maintain contacts 74, 76 in a closed position when thermostatic switch 14 is in any one of the plurality of heating positions.

A pair of serially connected heating coils 78, 80 are adapted to be connected across the source of power 12 by closure of contacts 74, 76 and this circuit is completed by a wire 82 connecting one end of coil 78 to one side of the source 12 and a wire 84 connecting one end of coil 80 to contact 76. The heat generated by coil 78 is utilized to actuate a bimetal 86 disposed in operative relation thereto and which carries a contact 88 movable therewith and cooperable with a stationary contact 90. Contacts 88 and 90 are normally in a closed position when coil 78 is de-energized and are operative for short circuiting coil 78 under certain conditions of operation in a manner to be described hereinafter. A circuit for short circuiting coil 78 is provided by a wire 92 connecting contact 88 to one end of coil 78 and wires 94 and 95, respectively, connecting contact 90 to contact 40 and switch arm 36 to the other end of coil 78.

The heat generated by coil 80 is utilized to actuate a bimetal 96 disposed in operative relationship thereto and which carries a contact 97 movable therewith and cooperable with a stationary contact 98. Contacts 97 and 98 are normally maintained in an open position and are connected in shunt across contacts 27, 28 for completing the circuit from source 12 to the heating elements disposed in oven 10 when the clock 30 is in an "off" position.

As explained heretofore, when clock 30 is in the "manual" position, a heating operation can be commenced by turning dial 22 of thermostatic switch 14 to any one of the plurality of heating positions. When thermostatic switch 14 is placed in one of the plurality of heating positions, switch arm 73 is actuated for engaging contact 74 with contact 76 to connect coils 78 and 80 across the source of power 12. The heating effects of coils 78 and 80 are such that when contacts 74, 76 are moved to the closed position, only bimetal 86 is caused to warp by the heat of coil 78 to open contacts 88, 90 whereas bimetal 96 is not heated sufficiently by coil 80 to cause contact 97 to move into engagement with contact 98.

When it is desired to terminate the heating operation, dial 22 of thermostatic switch 14 is moved to the "off" position, thereby disconnecting the heating elements disposed in oven 10 from the source of power 12 and actuating switch arm 73 in a manner to open the circuit established between contacts 74 and 76. Coils 78 and 80 cease to generate heat and accordingly bimetal 86 will cool and resume its normal position allowing contact 88 to engage contact 90.

In the timed "on" position of clock 30, the identical circuit established heretofore when clock 30 is in the "manual" position is established and the heating operation will be terminated when the clock 30 automatically moves to the "off" position opening contacts 27 and 28 and closing 38 and 40. Since contacts 88 and 90 are in an open position, due to the energization of coil 78, the closing of contacts 38 and 40 is ineffective to allow the heating operation to continue. Thereafter, if the operator rotates dial 22 of thermostatic switch 14 to the "off" position, heating coils 78 and 80 will be disconnected from the source of power 12, because contacts 74 and 76 will be open, and the bimetal 86 will resume its normal position engaging contact 88 with contact 90. The circuit is now in a condition to perform a subsequent manual heating operation even though the clock 30 is not placed into the "manual" position.

It will be noted, with contacts 88 and 90 in a closed position, that a circuit can be traced from one end of coil 78 through wire 92, contacts 88, 90, wire 94, contacts 38, 40 and wire 95 to the other end of coil 78, thus effectively short circuiting coil 78. When the thermostatic switch 14 is now rotated by dial 22 to one of the plurality of heating positions, switch arm 73 will be actuated moving contact 74 into engagement with contact 76 and with coil 78 short circuited, only coil 80 will be connected across the source of power 12. Sufficient heat will be generated by coil 80 to cause movement of bimetal 96 and engagement of contact 97 with contact 98. A short circuit across contacts 27, 28 is thus established to connect the source of power 12 to the heating elements disposed in oven 10 and a manual heating operation is thus performed which will be terminated only when the operator rotates dial 22 of thermostatic switch 14 to the "off" position.

Although specific embodiments of the invention have been shown and described, it will be readily apparent that many modifications may be made by those skilled in the art. Such modifications may be made in the details of construction and arrangement of parts without departing from the scope of the invention as set forth in the appended claims.

I claim:

1. In a control device for controlling a heating circuit from a source of electric power, the combination comprising a thermostat operable between an "off" position and a plurality of heating positions for controlling the heating circuit, a timing device having at least an "off" position and a timed "on" position, first switch means operable between an open position and a closed position by movement of said timing device between the "off" position and the timed "on" position for connecting said thermostat to the source of electric power, second switch means connected in parallel with said first switch means, and circuit means established by movement of said thermostat to the "on" position when said timing device is in the "off" position for closing said second switch means to connect said thermostat to the source of electric power independently of said first switch means.

2. In a control device for controlling a heating circuit from a source of electric power, the combination comprising a thermostat operable between an "off" position and a plurality of heating positions for controlling the heating circuit, a timing device having at least an "off" position and a timed "on" position, first switch means operable between an open position and a closed position by movement of said timing device between the "off" position and the timed "on" position, second switch means operable momentarily to a closed position by movement of said thermostat from the "off" position to one of the plurality of "on" positions, third switch means connected in parallel with said first switch means, and means operatively connected between said first and second switch means to close said third switch means and establish a circuit to the source of electric power for said thermostat independently of said first switch means.

3. In a control device for controlling a heating circuit from a source of electric power, the combination comprising a thermostat operable between an "off" position and a plurality of heating positions for controlling the heating circuit, a timing device having at least an "off" position and a timed "on" position, first switch means operative by movement of said timing device to the timed "on" position for connecting said thermostat to the source of electric power, relay means operable between energized and de-energized conditions and including a contact operable to the closed position for short circuiting said first switch means when said relay is energized, a second switch means operative to connect said relay means to a source of electric power by movement of said timing device to the "off" position, third switch means operable momentarily to the closed position by said thermostat when said thermostat is moved from the "off" position to one of the plurality of heating positions for energizing said relay means, and fourth switch means operable momentarily to the open position by said thermostat when said thermostat is moved to the "off" position for de-energizing said relay means.

4. In a control device for controlling a heating circuit from a source of electric power, the combination comprising a thermostat operable between an "off" position and a plurality of heating positions for controlling the heating circuit, a timing device having at least an "off" position and a timed "on" position, first switch means operable to the closed position by said timing device when said timing device is moved to the timed "on" position for connecting said thermostat to a source of electric power, second switch means operable to the closed position by said timing device when said timing device is moved to the "off" position, relay means operable between energized and de-energized conditions operatively connected to said second switch means and including a contact operable to the closed position when said relay is energized for short circuiting said switch means, third switch means operable to the closed position by said thermostat when said thermostat is moved from the "off" position to one of the plurality of heating positions for establishing a circuit to energize said relay means, and fourth switch means operable to the open position by said thermostat when said thermostat is moved to the "off" position for rendering the circuit to energize said relay means ineffective.

5. In a control device for controlling a heating circuit from a source of electric power, the combination comprising a thermostat operable between an "off" position and a plurality of heating positions for controlling the heating circuit, a timing device having at least an "off" position and a timed "on" position, first switch means operable to the closed position by said timing device when said timing device is moved to the "off" position, second switch means operable to the closed position by said timing device when said timing device is moved to the timed "on" position for connecting said thermostat to a source of electric power, third switch means operable to the open position by said thermostat when said thermostat is moved to the "off" position and to the closed position when said thermostat is moved to any of said plurality of heating positions, heating means disposed between said third switch means and a source of electric power, and a plurality of thermally responsive means heated by said heating means and operative when said third switch means is in the closed position to connect said thermostat to the source of electric power independently of said second switch means.

6. In a control device for controlling a heating circuit from a source of electric power, the combination comprising a thermostat operable between an "off" position and a plurality of heating positions for controlling the heating circuit, a clock having at least an "off" position and a timed "on" position, first switch means operable to the closed position by said clock when said clock is moved to the "off" position, second switch means operable to the closed position by said clock when said clock is moved to the timed "on" position for connecting said thermostat to the source of electric power, third switch means operable to the open position by said thermostat when said thermostat is moved to the "off" position and to the closed position when said thermostat is moved to any of the plurality of heating positions, a pair of heating elements serially connected between said third switch means and a source of electric power, a first thermally responsive means heated by one of said heating means and serially connected with said first switch means for short circuiting one of said heating elements, and second thermally responsive means heated by the other of said heating elements and operable to a closed position thereby for short circuiting said second switch means when said third switch means is in the closed position.

References Cited in the file of this patent
UNITED STATES PATENTS

| | | |
|---|---|---|
| 2,721,926 | Baird | Oct. 25, 1955 |
| 2,742,558 | Simmons | Apr. 17, 1956 |
| 2,798,929 | Wojcik | July 9, 1957 |
| 2,817,401 | Ostrander | Dec. 24, 1957 |
| 2,837,621 | Lux et al. | June 3, 1958 |